Patented Feb. 22, 1938

2,109,372

UNITED STATES PATENT OFFICE 2,109,372

DYE

James W. Hinds, Dallas, Tex., assignor of forty-nine percent to Paul J. Pond, Wichita Falls, Tex.

No Drawing. Application June 11, 1934, Serial No. 730,065

5 Claims. (Cl. 8—5)

The invention relates to a dye and the method of making and using such dye, so that a better penetration and even coloring of the material will result.

In the present practice of using what is generally known as vat dye or sulphur dye, it is usual to add chemicals to the dye and water in order to render the dye soluble in an alkaline solution. With the dye in this condition the dyeing operation is performed, and it is then necessary to permit oxidation of material to evaporate the chemical which has been added to dissolve the dye. The added chemical usually has a chemical reaction with the dye to not only change its color, but its substance, in such a manner that even distribution and the desired coloring are difficult to obtain. With these difficulties in mind, the present invention has been developed in order to make the dye readily soluble so that an oxidizing process will not be required, and so that the true color may be obtained during the dyeing operation, and so that it will have a greater luster after the dyeing has been accomplished.

It is one of the objects of the invention to provide a dye made up of a mixture of dye and pyridine.

Another object of the invention is to provide a dye which is composed of a mixture of dye, pyridine and water.

It is also an object of the invention to accomplish in the art of dyeing a better penetration of the material by completely dissolving a vat dye in pyridine.

A still further object of the invention is to use pyridine, its homologues or its derivatives, as solvents for dyes.

The invention will be readily understood when it is appreciated that pyridine is a white colorless liquid $C_5H_5N$ which is a solvent for sulphur or vat dyes as they are generally known. In event a strong dye is desired it is possible by the present invention to merely dissolve the dye in a quantity of pyridine and use this solution to dye the material. As a general rule, however, a full shade dye may be obtained by using equal parts of dye and pyridine, and adding a considerable volume of water. Thus with the dye in general use 1½ ounces of dye and 1½ ounces of pyridine added to a gallon of water will obtain a full shade of that dye. It is desirable to use equal parts of pyridine and dye but these proportions may vary in accordance with the circumstances under which the dye is used, as well as the material to be dyed.

The pyridine acts as a solvent for sulphur dyes of the type which may contain soda ash so that a uniform liquid is obtained for dyeing purposes because of the very fine nature of the particles of pyridine and water. It has been found that a pyridine of the type here disclosed is of particular advantage in dyeing leather because the pyridine serves to penetrate the leather and carry the dye with it because of the interfacial contact of the pyridine with the dye and water to form a colloidal suspension so that even if a leather dyed in this manner is dry cleaned or washed it retains its original color and luster.

An even coloring is obtained by the use of a pyridine dye because of the even distribution.

The term "pyridine" is here used as including not only pyridine per se, but all the homologues or derivatives of pyridine as well, it being intended that any such homologues or derivatives having qualities of pyridine may be used for the same purposes as the pyridine itself.

It is contemplated that the invention may be applied to the dyeing of any desired fabric such as cotton, leather, substitutes therefor, and such materials as linoleum. While these are given as illustrations, the invention is not to be limited to such materials.

In carrying out the invention the dye, pyridine and water may be mixed together in any proportion or part desired to obtain the bath. The material is then drummed or agitated in the bath for the desired period in order that an even penetration of the material may be obtained. The material is then removed from the bath and rinsed as desired. If necessary a rinse composed of acetic acid, sodium dichromate and copperas may be used. If a fixer is desired sodium hydrosulphite or some other suitable reducing agent may be used.

The invention contemplates broadly the dissolving of dye in pyridine, its homologues or its derivatives, and the use of such dyes.

What is claimed is:

1. In the art of preparing a dye bath the step of preparing a sulphur dye which consists of mixing substantially equal parts of dye and of pyridine whereby the dye will be dissolved in the pyridine.

2. In the art of dyeing leather with a sulphur dye the steps of dissolving the dye in pyridine and treating the leather with the dissolved dye whereby the dye will penetrate the leather.

3. A leather dye composed of substantially equal parts of sulphur dye and pyridine.

4. In the art of dyeing leather the step of immersing the leather in a bath composed of sulphur dye, pyridine, soda ash and water.

5. A method of dyeing leather to obtain a penetration of the leather by the dye which consists of drumming the leather in a solution including sulphur dye and pyridine and rinsing the leather.

JAMES W. HINDS.